(12) United States Patent
Gulati et al.

(10) Patent No.: US 9,009,541 B2
(45) Date of Patent: Apr. 14, 2015

(54) EFFICIENT TRACE CAPTURE BUFFER MANAGEMENT

(75) Inventors: Manu Gulati, Saratoga, CA (US);
James D. Ramsay, San Jose, CA (US);
Kevin R. Walker, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 13/590,159

(22) Filed: Aug. 20, 2012

(65) Prior Publication Data

US 2014/0052930 A1 Feb. 20, 2014

(51) Int. Cl.
*G06F 11/34* (2006.01)
*G06F 11/22* (2006.01)
*G06F 12/08* (2006.01)

(52) U.S. Cl.
CPC .............. *G06F 11/22* (2013.01); *G06F 12/084* (2013.01); *Y02B 60/1225* (2013.01)

(58) Field of Classification Search
CPC .. G06F 11/3466; G06F 11/348; G06F 11/349
USPC ........................................................ 714/45
See application file for complete search history.

(56) References Cited

U.S. PATENT DOCUMENTS

| 7,340,564 | B2 | 3/2008 | Twomey |
| 7,747,822 | B1 | 6/2010 | Favor et al. |
| 7,984,338 | B2 | 7/2011 | Walker et al. |
| 8,001,333 | B2 | 8/2011 | Pong |
| 2004/0078685 | A1* | 4/2004 | Glass ............................... 714/38 |
| 2005/0268158 | A1* | 12/2005 | McIntosh et al. .................. 714/5 |
| 2006/0095674 | A1* | 5/2006 | Twomey ........................ 711/125 |
| 2007/0226177 | A1* | 9/2007 | Barsness et al. ................... 707/2 |
| 2008/0046851 | A1* | 2/2008 | Miczo ............................... 716/7 |
| 2010/0332909 | A1* | 12/2010 | Larson ............................ 714/40 |
| 2013/0031314 | A1* | 1/2013 | Kinter ........................... 711/141 |

FOREIGN PATENT DOCUMENTS

WO 2009120787 10/2009

* cited by examiner

*Primary Examiner* — Chae Ko
(74) *Attorney, Agent, or Firm* — Rory D. Rankin; Meyertons, Hood, Kivlin, Kowert & Goetzel, P.C.

(57) ABSTRACT

A system and method for efficiently storing traces of multiple components in an embedded system. A system-on-a-chip (SOC) includes a trace unit for collecting and storing trace history, bus event statistics, or both. The SOC may transfer cache coherent messages across multiple buses between a shared memory and a cache coherent controller. The trace unit includes a trace buffer with multiple physical partitions assigned to subsets of the multiple buses. The number of partitions is less than the number of multiple buses. One or more trace instructions may cause a trace history, trace bus event statistics, local time stamps and a global time-base value to be stored in a physical partition within the trace buffer.

25 Claims, 10 Drawing Sheets

EFFICIENT TRACE CAPTURE BUFFER MANAGEMENT

BACKGROUND OF THE INVENTION

1. Field of the Invention

This invention relates to electronic circuits, and more particularly, to efficiently storing traces of multiple components in an embedded system.

2. Description of the Relevant Art

A system-on-a-chip (SOC) integrates multiple functions into a single integrated chip substrate. The functions may include digital, analog, mixed-signal and radio-frequency (RF) functions. Typical applications are used in the area of embedded systems. Cellular phones, smartphones, portable communication devices, tablet computers, entertainment audio/video (A/V) devices, and even chip in automobiles are some examples of systems using an SOC. An SOC may use processors that execute operating system (OS) software. In addition, the SOC may be connected to both external memory chips, such as Flash or RAM, and various external peripherals.

As integration on an SOC increases, the interrelationships between on-die components become more complex. In addition, embedded systems may not have a basic-input-output-software (BIOS) or machine abstraction layer to insulate the operating system (OS) from low-level device management. Therefore, the kernel in the OS may handle these tasks. The shortening time-to-market coupled with the increasing complexity of both hardware and software creates a number of challenges to verify embedded system designs.

Basic run-control debugging includes single-stepping, breakpoints, and access to memory and a component's registers while the component is not running Basic run-control debugging typically uses a Joint Test Action Group (JTAG) interface. However, this type of debugging is obtrusive as it interferes with the program execution. In addition, setting breakpoints is not beneficial for debugging real-time embedded systems.

Another type of debugging includes an unobtrusive real-time collection of a history during program execution. A stored program history allows designers to perform a walk through of a program to a point of failure, which benefits investigations of intermittent and real-time failures. Software and hardware traces provide a historical account of application code execution, behavior, timing, and data accesses. A hardware trace is on-die logic that may monitor one or more of an address, data, and control signals within the SOC and sends corresponding information to be stored in a trace capture buffer, or trace buffer. The trace buffer is typically an on-die circular buffer that continuously captures trace information until halted.

Capturing program and data traces for a complete program unobtrusively and in real-time may require large on-die trace buffers and wide trace ports. A large amount of distributed trace hardware may still miss the temporal relationship between asynchronous requests across the SOC. Even reduced hardware support for integrating hardware traces on the SOC and sending out information through trace ports consumes on-die real estate. Therefore, designers prefer a limited amount of debug hardware on the SOC, but also debug hardware that provides flexibility and a high degree of visibility to the activities occurring on the SOC.

In view of the above, methods and mechanisms for efficiently monitoring traces of multiple components in an embedded system are desired.

SUMMARY OF EMBODIMENTS

Systems and methods for efficiently storing traces of multiple components in an embedded system are contemplated. In various embodiments, a system-on-a-chip includes a trace unit for collecting and storing trace history and collecting qualified bus event statistics, such as bus event counts. The SOC may transfer cache coherent messages across multiple buses between a shared memory and a cache coherent controller. The cache coherent controller may provide to multiple integrated circuit (IC) devices, or functional blocks, a consistent data value for a given data block in the shared memory. Control logic within the SOC may select one or more buses of the multiple buses between the shared memory and the cache coherent controller for monitoring bus traffic. The control logic may monitor the selected one or more buses for one or more qualified bus events. The qualified bus events include at least a match between a value on a given bus of the selected buses and a second value stored in programmable configuration registers. In response to determining one or more qualified bus events, the control logic executes an associated trace instruction.

The trace unit may include a trace buffer with multiple physical partitions assigned to subsets of the multiple buses. Each partition may be a separate random access memory (RAM). The number of partitions may be less than a number of buses being monitored at the coherence point. One or more trace instructions may cause a trace history, trace bus event statistics, local time stamps and a global time-base value to be stored in a physical partition within the trace buffer.

These and other embodiments will be further appreciated upon reference to the following description and drawings.

Figure 1:
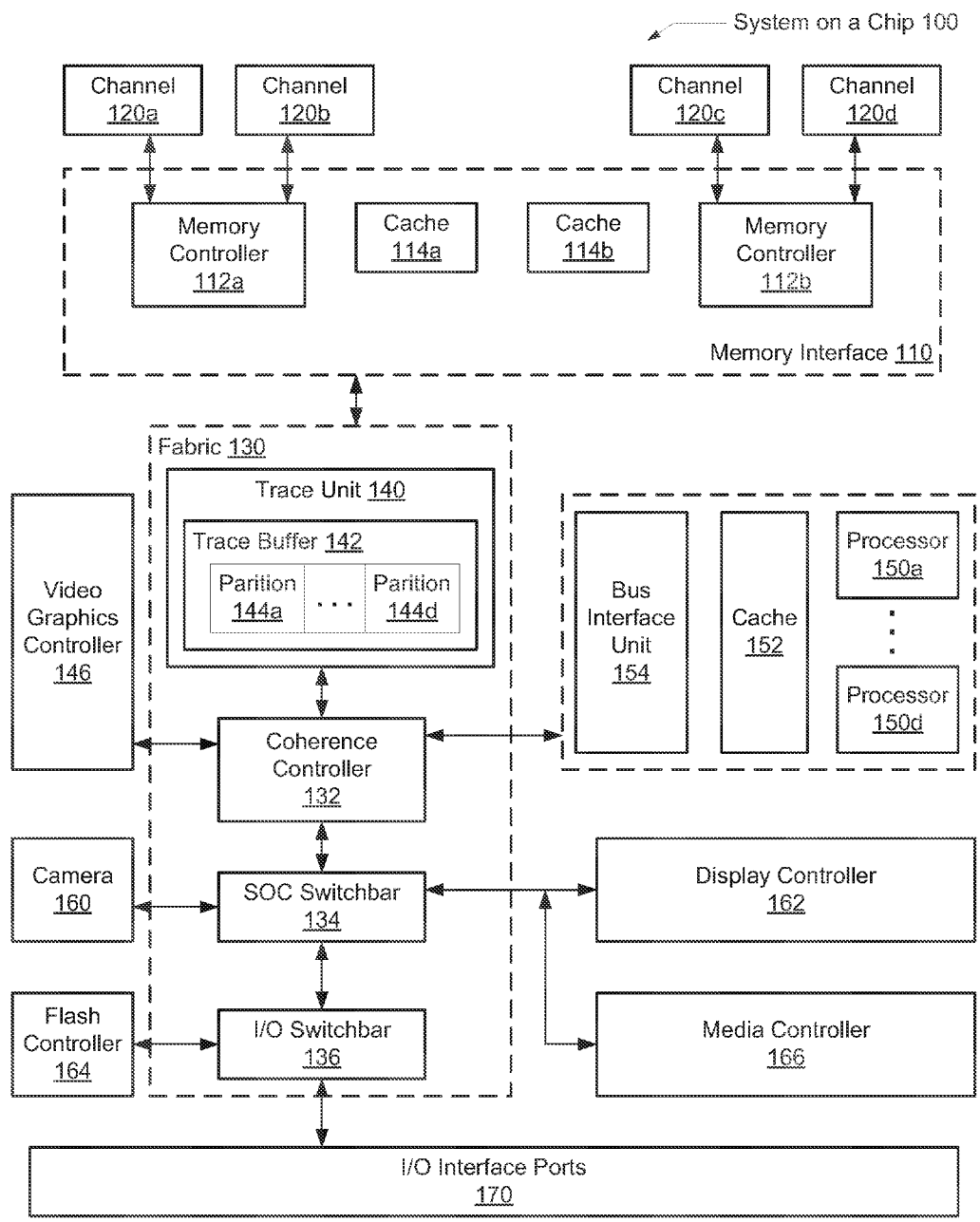
FIG. 1 is a generalized block diagram of one embodiment of a system-on-a-chip (SOC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a system-on-a-chip (SOC) 100 is shown. The SOC 100 is an integrated circuit (IC) that includes multiple types of IC designs on a single semiconductor die, wherein each IC design provides a separate functionality. Traditionally, each one of the types of IC designs may have been manufactured on a separate silicon wafer. In the illustrated embodiment, the SOC 100 includes multiple IC designs, a fabric 130 for high-level interconnects and chip communication, a memory interface 110, and various input/output (I/O) interfaces 170. Clock sources, such as phase lock loops (PLLs), and a centralized control block for at least power management are not shown for ease of illustration.

The multiple IC designs within the SOC 100 may include various analog, digital, mixed-signal and radio-frequency (RF) blocks. For example, the SOC 100 may include one or more processors 150a-150d with a supporting cache hierarchy that includes at least cache 152. In addition, the multiple IC design may include a flash memory controller 164 and a media controller 166. Further, the multiple IC designs may include a video graphics controller 146 and one or more processing blocks associated with real-time memory performance for display and camera subsystems, such as camera 160.

Any real-time memory peripheral processing blocks may include image blender capability and other camera image processing capabilities as is well known in the art. The SOC 100 may group processing blocks associated with non-real-time memory performance, such as the media controller 166, for image scaling, rotating, and color space conversion, accelerated video decoding for encoded movies, audio processing and so forth. The units 160 and 166 may include analog and digital encoders, decoders, and other signal processing blocks. In other embodiments, the SOC 100 may include other types of processing blocks in addition to or in place of the blocks shown.

In various embodiments, the fabric 130 provides a top-level interconnect for the SOC 100. For example, connections to the cache coherence controller 132 may exist for various requestors within the SOC 100. A requestor may be one of the multiple IC designs on the SOC 100. The cache coherence controller 132 may provide to the multiple IC designs a consistent data value for a given data block in the shared memory, such as off-chip dynamic random access memory (DRAM). The coherence controller 132 may use a cache coherency protocol for memory accesses to and from the memory interface 110 and one or more caches in the multiple IC designs on the SOC 100. An example of a cache coherency protocol includes the MOESI protocol with the Modified (M), Owned (O), Exclusive (E), Shared (S), and Invalid (I) states.

In some embodiments, one requestor connection to the coherence controller 132 may be provided for one or more graphics processing units (GPUs) within the video graphics controller 146, one requestor connection for the processor cores 150a-150d, and one request connection for the remainder of the multiple IC designs and the I/O interface ports 170 on the SOC 100. The SOC switchbar 134 may be used to aggregate traffic from these remaining multiple IC designs. The SOC switchbar 136 may be used to aggregate traffic from the I/O interface ports 170 and other components, such as the flash controller 164.

In various embodiments, different types of traffic may flow independently through the fabric 130. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels.

The coherence controller 132 may allow memory access requests from any requestor on the SOC 100 to snoop the cache 152. Thus, data produced by the processors 150a-150d may not be explicitly flushed for the data to be visible to the other IC designs of the multiple IC designs on the SOC 100. If the most recent copy of data is present in the cache 152, then read requests may receive the most recent copy from the cache 152.

For write requests, merging may be performed for a cache line present in the cache 152 for any requestor on the SOC 100. If another requestor updates each byte of the cache line, then the data in the cache 152 may be invalidated. In some embodiments, the cache coherence scheme performed by the coherence controller 132 may not keep track of the state of any other cache on the SOC 100. For example, one or more GPUs may have associated caches or buffers. In addition, other processors outside of the processors 150a-150d may be on the SOC 100 and include their own caches. The initial fill into these other caches may receive the most recent copy of data, but modifications to the data may not be tracked or kept consistent with the cache 152. In some embodiments, the cache 152 may be a shared level two (L2) cache for the processors 150a-150d.

The interface between the combination of the memory interface 110 and the coherency controller 132 and the remainder of the SOC 100 includes multiple buses. The remainder of the SOC 100 may include the multiple IC designs and the switch bars 134 and 136. The multiple buses within this interface may offer visibility of fabric activity within the SOC 100 along with a global ordering point across the SOC 100. Asynchronous memory requests, responses, snoops, snoop responses, and input/output (I/O) transactions are visible at this interface with temporal relationships. A single coherence point on the SOC 100 offers this global ordering point visibility of the activity occurring on the SOC 100.

Capturing transaction information, such as trace history and statistics, at the coherence point interface may offer a high degree of visibility to the activities occurring on the SOC 100. This visibility may also offer an efficient and flexible manner to debug the design of the SOC 100. Although the SOC 100 may include multiple buses in a hierarchical structure distributed across the SOC 100, a distributed debug monitoring system may be replaced with a centralized debug monitoring system at the coherence point interface.

Multiple buses may be located at the coherence point. For example, the buses at the coherence point may include at least memory requests for off-chip memory, off-chip memory responses, cache coherent snoops, and cache coherent snoop responses. Cache coherent traffic passes through the coherence point providing high visibility to system traffic. In some embodiments, traffic monitoring hardware or resources may be used for unobtrusive collection of trace history for each of the multiple buses located at the coherence point. However, flexibility may be limited. During system debugging, a designer may wish to monitor multiple events on one or more buses while not monitoring one or more other buses. With dedicated traffic monitoring hardware or resources for unobtrusive monitoring for each bus, this type of debugging may be unavailable. Providing a dedicated traffic monitoring resource for each of the multiple buses may consume an appreciable amount of on-die real estate. However, multiple programmable traffic monitoring resources may offer greater flexibility without consuming an appreciable amount of on-die real estate. The trace unit 140 may include multiple programmable traffic monitoring resources.

Additionally, one or more buses at the coherence point may be grouped into a class. For example, the coherence point on the SOC 100 may have symmetrical right and left buses for traffic flow. The asynchronous memory requests for off-chip memory, memory responses, and cache coherent snoop responses may be directed to either a corresponding right bus or a corresponding left bus. Each of the left buses may be grouped into a first class and each of the right buses may be grouped into a second class. In addition, both left and right memory requests may be grouped into a fourth class, both left and right memory responses may be grouped into a fifth class, and so forth. Table 1 below illustrates one embodiment of representing bus classes at a coherence point on an SOC. Here, bus traffic flow uses symmetrical left and right buses. The bus traffic type and the bus traffic flow direction may be used to define the classes.

TABLE 1

Bus Classes at Coherence Point and Trace Buffer Physical Partitions

| Bus | Bus Class | Trace Buffer Physical Partition |
|---|---|---|
| Memory Request Right Memory Request Left | Memory Request | First Partition |
| Coherence Response Right Coherence Response Left | Coherence Response | Second Partition |

TABLE 1-continued

Bus Classes at Coherence Point and Trace Buffer Physical Partitions

| Bus | Bus Class | Trace Buffer Physical Partition |
|---|---|---|
| Memory Response Right Memory Response Left | Memory Response | |
| Coherence Command | Coherence Command | Third Partition |

A designer may wish to monitor a bus class, rather than individual buses. However, providing multiple traffic monitoring resources for both individual buses and classes of buses again may consume an appreciable amount of on-die real estate. Further, a designer may wish to collect statistics of bus events rather than or in addition to actual trace histories. The trace unit 140 on the SOC 100 may provide this functionality. Additionally, as seen above, the trace capture buffer 142 may be a logical single buffer, but also physically split into multiple physical partitions 144a-144d. Each one of the physical buffers, or partitions, 144a-144d within the trace buffer 142 may be assigned to particular buses or to particular bus classes. However, the number of physical partitions 144a-144d within the trace buffer 142 may be less than the number of buses at the coherence point. The assignments may be programmable by writing associated configuration registers in the trace unit 140.

Physically dividing the trace buffer 142 into physical partitions 144a-144d may provide greater flexible and efficient data storage in the trace buffer 142. Designers may know which buses and bus classes have more bus traffic and larger bus fields, and the designers may set the assignments accordingly. Further, dividing the trace buffer 142 into physical partitions 144a-144d may provide more efficient reading of the stored trace information, since particular buses are grouped together, rather than trace information for all of the buses is stored in a single physical buffer. Access times may be reduced by physically splitting the trace buffer 142 into the physical partitions 144a-144d. Additionally, a given one of the physical partitions 144a-144d may be updated at a time, rather than each of the partitions 144a-144d. Therefore, overall power consumption for accesses may be reduced. A detailed description of the trace buffer 142 and the physical partitions is provided later. First, a further description of the components within the SOC 100 is provided.

The memory interface 110 may include one or more memory controllers and one or more memory caches for the off-chip memory, such as dynamic random access memory (DRAM). The memory caches may be used to reduce the demands on memory bandwidth and average power consumption. In various embodiments, the memory interface 110 includes memory controllers 112a-112b and memory caches 114a-114b. As shown, in some embodiments, the memory controllers 112a-112b may not be a coherency point within the SOC 100 as they are separate from the coherence controller 132. This separation may allow an associated system level memory cache, such as caches 114a-114b, to be inserted in the path to memory. The memory caches 114a-114b may be logically located between the coherence controller 132 and the memory controllers 112a-112b. Additionally, the memory caches 114a-114b may not participate in a cache coherency protocol.

The memory caches 114a-114b may be used by each one of the multiple IC designs on the SOC 100. The allocation policy for the memory caches 114a-114b may be programmable. The memory caches 114a-114b may also be used in a synchronous RAM (SRAM) mode for system boot and system debug. One or more memory channels 120a-120d may be connected to the memory interface 110. Each of the memory channels 120a-120d may be a separate interface to a memory, such as a dynamic random access memory (DRAM). The memory controllers 112a-112b may include request queues for queuing memory requests. The memory controllers 112a-112b may also include logic for supporting a given protocol used to interface to the memory channels 120-120d. The protocol may determine values used for information transfer, such as a number of data transfers per clock cycle, signal voltage levels, signal timings, signal and clock phases and clock frequencies. Protocol examples include DDR2 (Double Data Rate, version 2) SDRAM, DDR3 SDRAM, GDDR4 (Graphics Double Data Rate, version 4) SDRAM, and GDDR5 (Graphics Double Data Rate, version 5) SDRAM.

Each one of the processors 150a-150d may include one or more cores and one or more levels of a cache memory subsystem. Each core may support the out-of-order execution of one or more threads of a software process and include a multi-stage pipeline. Each one of the processors 150a-150d may include circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture may be selected.

Generally, the processors 150a-150d may include multiple on-die levels (L1, L2, L3 and so forth) of caches for accessing data and instructions. If a requested block is not found in the on-die caches or in the off-die cache 152, then a read request for the missing block may be generated and transmitted to the memory interface 110 or to on-die flash memory (not shown) controlled by the flash controller 164. The flash memory may be a non-volatile memory block formed from an array of flash memory cells. Alternatively, the memory 150 may include other non-volatile memory technology. The bus interface unit (BIU) 154 may provide memory access requests and responses for at least the processors 150a-150d.

The processors 150a-150d may share the on-chip flash memory and the off-chip DRAM accessed through the memory interface 110 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherent transactions between processing blocks and peripherals. In a SOC design that includes multiple processors and processing blocks, these components communicate with each other to control access to shared resources. The coherence controller 132 in the fabric 130 may manage memory coherence.

Other processor cores on SOC 100 may not include a mirrored silicon image of processors 150a-150d. These other processing blocks may have a micro-architecture different from the micro-architecture used by the processors 150a-150d. For example, other processors may have a micro-architecture that provides high instruction throughput for a computational intensive task, such as a single instruction multiple data (SIMD) core. Examples of SIMD cores include graphics processing units (GPUs), digital signal processing (DSP) cores, or other. For example, the video graphics controller 146 may include one or more GPUs for rendering graphics for games, user interface (UI) effects, and other applications.

The SOC 100 may include processing blocks for real-time memory performance, such as the camera 160 and the display controller 162, as described earlier. In addition, the SOC 100 may including processing blocks for non-real-time memory performance for image scaling, rotating, and color space conversion, accelerated video decoding for encoded movies, audio processing and so forth. The media controller 166 is one example. The I/O interface ports 170 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Figure 2:
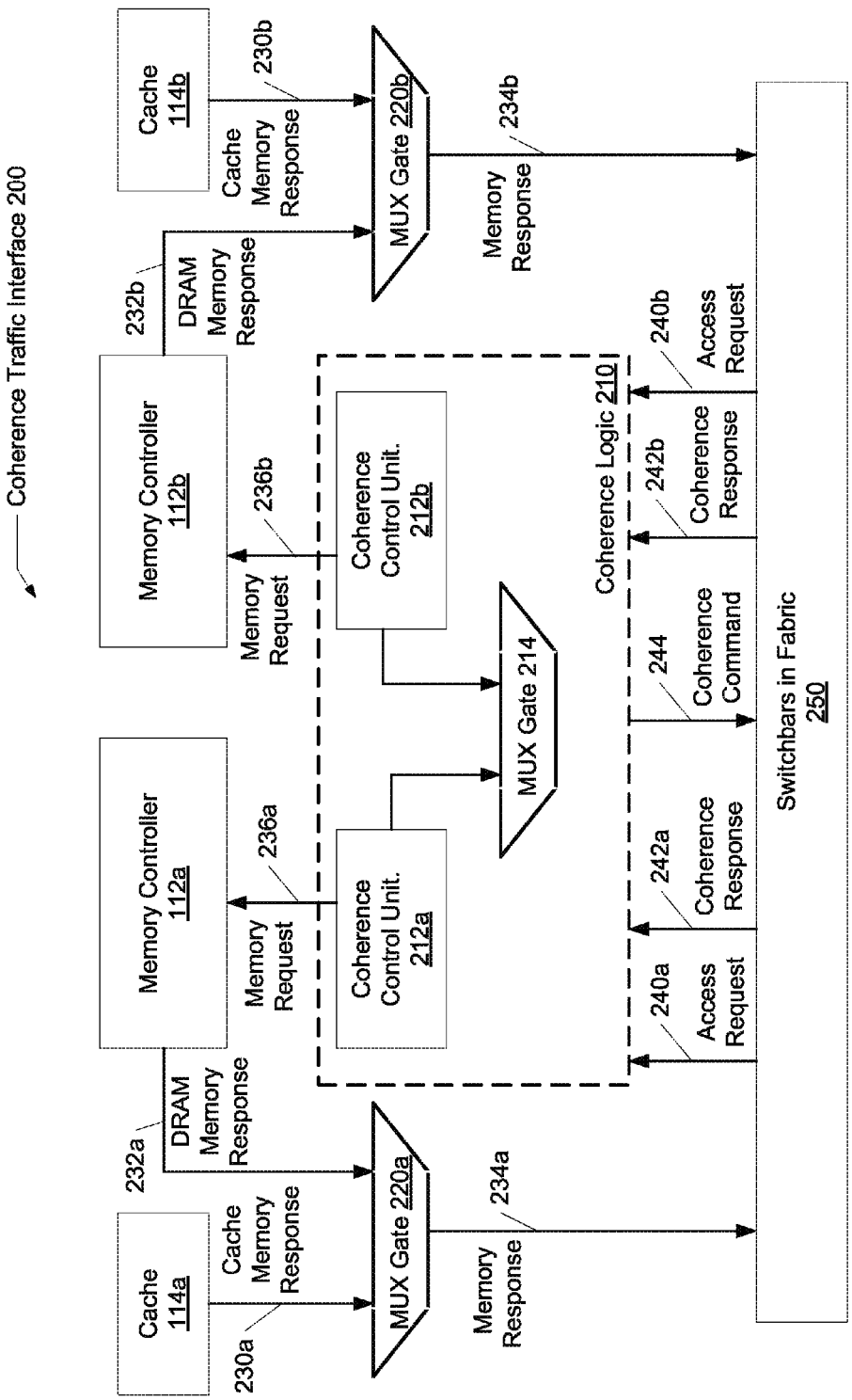
FIG. 2 is a generalized block diagram of one embodiment of a cache coherence traffic interface 200 on a system-on-a-chip (SOC).

Turning now to FIG. 2, a generalized block diagram of one embodiment of a cache coherence traffic interface 200 on a system-on-a-chip (SOC) is shown. Circuitry and logic described earlier are numbered identically. The interface 200 includes the coherence logic 210, which interfaces with at least the memory controllers 112a-112b and the switch bars 230. In some embodiments, the coherence logic 210 and the switch bars 250 are within the fabric 130 on the SOC 100. Here, bus traffic between the switch bars 250 in the fabric on the SOC, coherence logic 210, and memory is shown.

The bus traffic may include coherence commands 244 from the coherence logic 210. The coherence commands 244 are coherence commands sent to the switch bars 250 in the fabric on the SOC rather than to the memory interface that includes the memory controllers 112a-112b and the memory caches 114a-114b. Examples of the coherence commands 244 may include at least a cache-line read-for-ownership command, a cache-line read-for-shared command, a cache-line writeback command, a cache-line upgrade command, and a cache-line invalidation command. Other examples of coherence commands are possible and contemplated. The bus traffic may include coherence command responses 242a-242b from one or more of the multiple IC designs on the SOC that are targeted by the coherence commands 244.

The bus traffic may also include asynchronous memory access requests 240a-240b from the multiple IC designs on the SOC and corresponding memory responses 234a-234b from the memory interface that includes the memory controllers 112a-112b and the memory caches 114a-114b. The coherence logic 210 may include coherence control units 212a-212b for routing traffic between the memory interface and the fabric according to bus classes, such as a left bus and a symmetrical right bus. The mux gate 214 may be used for this type of routing requests, responses, and commands. The memory requests 236a-236b may be requests from the access requests 240a-240b that the coherence logic 210 determines to send to the memory controllers 112a-112b.

The multiplexer gate 220a may select between the DRAM memory response 232a from the memory controller 112a and the cache memory response 230a from the memory cache 114a. Each of the responses 230a-232a may be in response to an earlier one of the received memory access requests 240a-240b from the switch bars 250 in the fabric on the SOC. Similarly, the multiplexer (mux) gate 220b selects between the DRAM memory response 232b from the memory controller 112b and the cache memory response 230b from the memory cache 114b. The selected responses 234a-234b may be sent to the switch bars 250 in the fabric of the SOC.

In various embodiments, the flexible on-die debug resources within the trace unit 116 may monitor buses 234a-234b, 240a-240b, 242a-242b and 244 and store trace history and collect statistics on bus events. The buses 234a-234b, 240a-240b, 242a-242b and 244 may provide a high degree of visibility to the activities occurring on the SOC. One or more of the 234a-234b, 240a-240b, 242a-242b and 244 may be grouped into a class as described earlier. The trace history and the statistics may be collected on a bus basis, on a class basis, or both. The trace information may be stored in a trace buffer that is divided into physical partitions.

Figure 3:
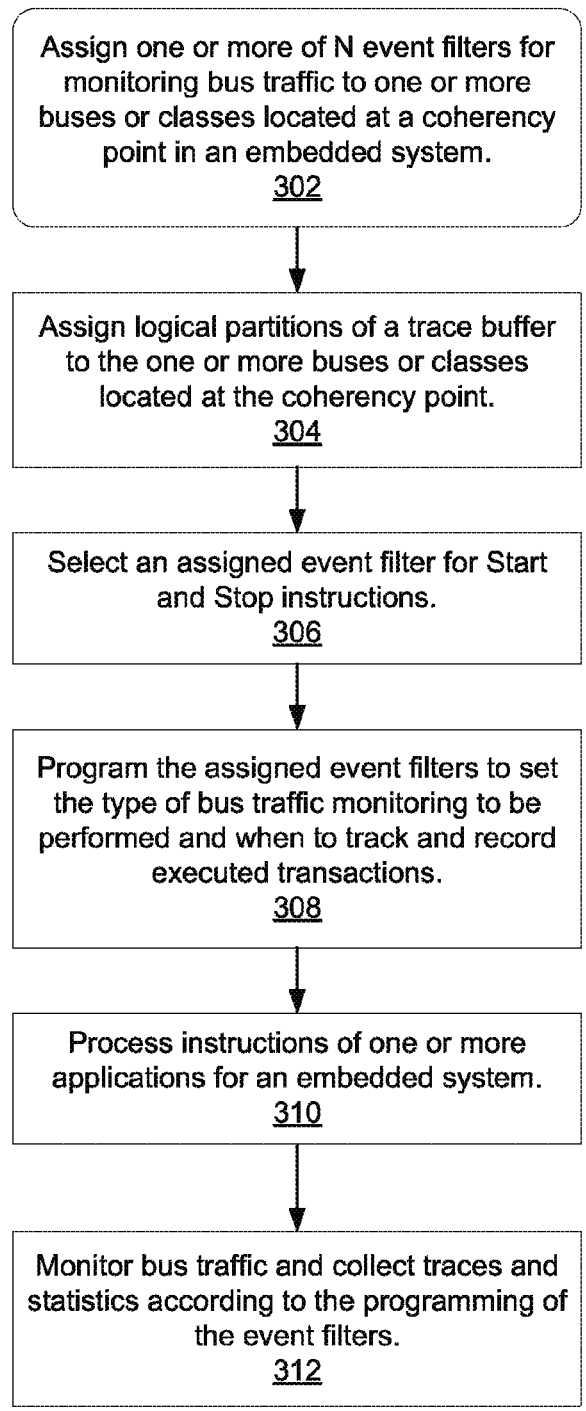
FIG. 3 is a generalized flow diagram of one embodiment of a method for monitoring bus traffic at a coherence point for debugging bus activity on a SOC.

Referring now to FIG. 3, a generalized flow diagram illustrating one embodiment of a method 300 for monitoring bus traffic for debugging bus activity on a SOC is shown. For purposes of discussion, the steps in this embodiment are shown in sequential order. However, some steps may occur in a different order than shown, some steps may be performed concurrently, some steps may be combined with other steps, and some steps may be absent in another embodiment.

A trace unit may include programmable on-die debug hardware or resources for collecting trace history and bus event statistics for one or more buses located at a coherence point. The trace unit may include N bus event filters, where N is an integer. Each event filter may include control logic for determining when valid transactions for collecting trace data have occurred on a given bus. The control logic may be connected to programmable control and status registers (CSRs) that store values used for the bus event filtering. The CSRs may also be referred to as configuration registers. The configuration registers may be programmed with trace instructions that are executed in response to the logic within the event filter determines a match between values in bus traffic on the bus or the bus class being monitored and values stored in the configuration registers. One example of a trace instruction is a trace start operation. In various embodiments, qualified trace history may be collected and stored in a trace buffer. Additionally, qualified bus events may have counts maintained. The trace buffer may be divided into physical partitions. Writing the programmable configuration registers may be used to assign the N bus event filters and the physical partitions of the trace buffer to particular buses or bus classes. There may be M buses at the coherence point, wherein M is an integer. The number of physical partitions within the trace buffer may be less than M.

In block 302, one or more of the N bus event filters for monitoring bus traffic is assigned to one or more buses or bus classes located at the coherency point in the computing system. In some embodiments, the computing system is an embedded system. In various embodiments, the embedded system is a system-on-a-chip (SOC). Referring briefly again to FIG. 2, a given bus event filter may be assigned to bus 244 for monitoring coherence command bus traffic on bus 244. Additionally, another bus event filter may be assigned to a bus class that includes coherence response buses 242a-242b. Yet another bus event filter may be assigned to a bus class that includes memory access request bus 240a and memory response bus 234a. Other assignments and groupings of buses are possible and contemplated.

Returning to method 300 in FIG. 3, in block 304, the multiple physical partitions within the trace buffer are assigned to one or more buses or bus classes located at the coherency point in the computing system. In some embodiments, the trace buffer may be divided into three physical partitions. Referring again to FIG. 2, a first partition within the trace buffer may be assigned to the memory access request buses 240a-240b. A second partition may be assigned to the cache coherence response buses 242a-242b and the memory response buses 234a-234b. A third partition may be assigned to the coherence command bus 244. Another number of partitions and other assignments to buses are possible and contemplated. Writing programmable configuration registers in the trace unit may perform the assignments for the bus event filters and the physical partitions within the trace buffer.

In block 306 of method 300 in FIG. 3, an assigned bus event filter may be selected for beginning a trace collection, a statistics collection, or both. The configuration registers associated with this assigned bus event filter may be programmed with values that correspond to the types of events and statistics to monitor. Additionally, the selected bus event filter may have corresponding configuration registers programmed with a trace start instruction. Another bus event filter may have corresponding configuration registers programmed with a trace stop instruction.

In block 308, one or more other bus event filters may have their corresponding configuration registers programmed with information indicating the type of bus traffic monitoring to perform and when to record executed transactions. In block 310, instructions of one or more applications are processed. The applications may execute on the embedded system.

In block 312, bus traffic is monitored according to both the assignments and the programming for the N bus event filters in the trace unit. Traces and bus event statistics are collected according to the assignments and the programming. Trace information is stored in the physical partitions of the trace buffer according to the assignments and the type of trace instruction. The bus event statistics, such as qualified bus event counts, may be stored in registers. These registers may be read out both during the collection of the trace history and at a later time after the collection of the trace history. For example, a Joint Test Action Group (JTAG) interface may be used during the debug process to read the bus event counter values. Alternatively, a device driver within the operating system (OS) may utilize a programmable input/output (PIO) access to gather the bus event counts.

Figure 4:
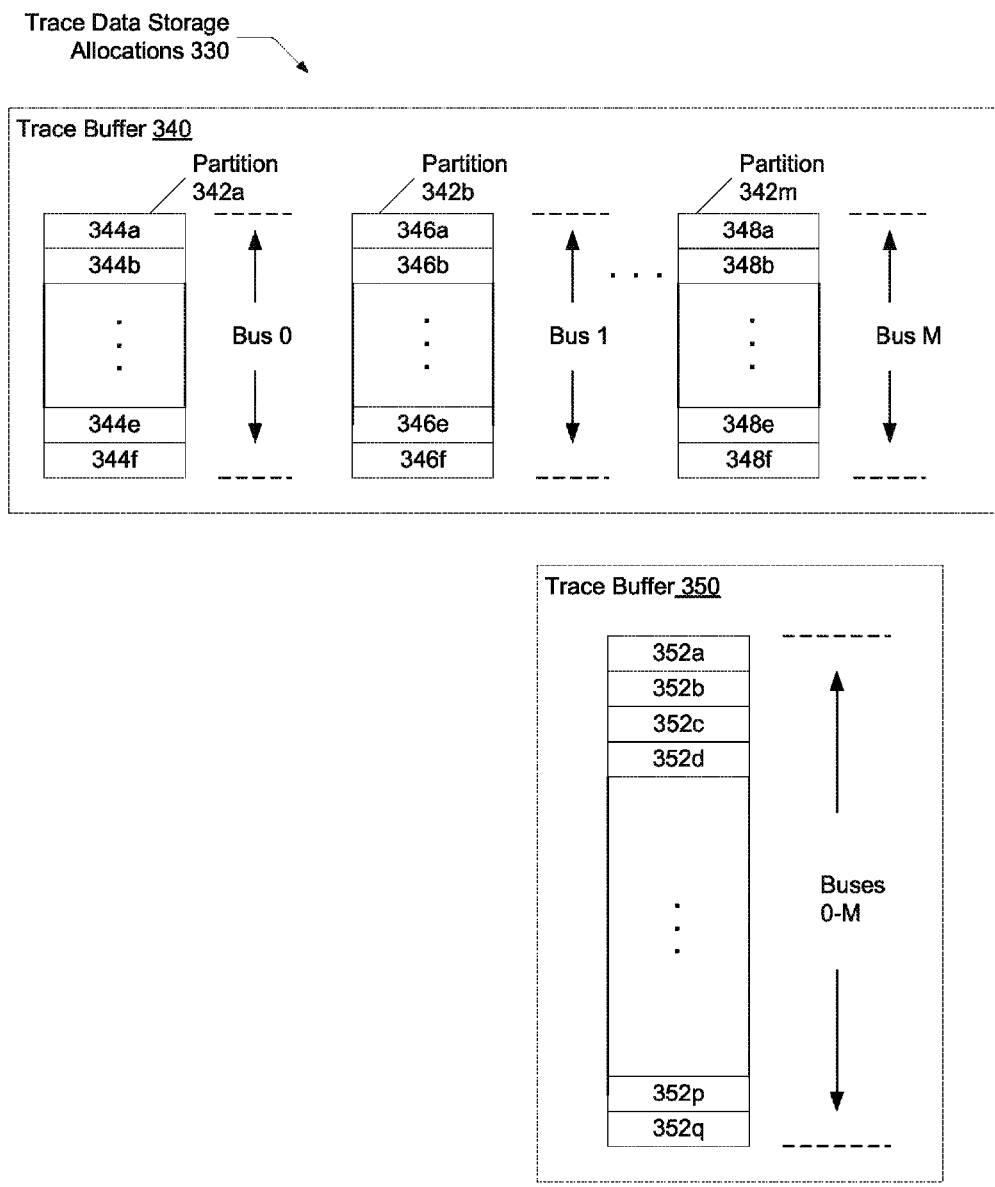
FIG. 4 is a generalized block diagram of one embodiment of trace data storage allocations.

Referring to FIG. 4, a generalized block diagram illustrating one embodiment of trace data storage allocations 330 is shown. The trace buffer 340 may correspond to data storage for trace history and bus event statistics used for debug purposes. The trace buffer 340 may include physical partitions 342a-342m. The trace buffer 340 may include a dedicated physical partition for each of M buses at a coherence point on a semiconductor chip. In various embodiments, each of the physical partitions 342a-342m is a separate RAM. The partition 342a may include entries 344a-344f. The partition 342b may include entries 346a-346f and the partition 342m may include entries 348a-348f. In some embodiments, each of the partitions 342a-342m may have an equal number of entries.

The trace buffer 340 may be partitioned on a bus basis. For example, the entries 344a-344f within the partition 342a may correspond to bus 0. Similarly, the entries 346a-346f within the partition 342b may correspond to bus 1, and entries 348a-348f within the partition 342m may correspond to bus M. Control circuitry used for writing, reading, the updating of pointers, and other is not shown for ease of illustration. Each of the entries 344a-344f, 346a-346f, and 348a-348f may store similar information, such as status, trace history, bus event statistics, and timestamp information. However, one or more fields within this information may have different widths based on the bus type being monitored.

For the trace buffer 340, statically allocating a physical partition for each bus being monitored at a coherence point may avoid starvation. The enforced fairness provided by this partitioning may also reduce the amount of complex circuitry used in determining which bus and associated partition receives a higher number of entries for data storage. Although the implementation of the trace buffer 340 may include lower hardware overhead, faster access times, easier readout of stored data for debug analysis, and less power consumption, scalability may be difficult. As the number M of buses grows, the consumption of on-chip real estate and power consumption may appreciably increase for the trace buffer 340. Signal line lengths greatly increase to reach a corresponding partition, which, due to cross-capacitance, degrade the signals being conveyed by these lines. A scaled design may also include more repeaters along the long lines, an increased number of storage sequential elements on the lines, a greater clock cycle time, larger wordline drivers, and a greater number of pipe stages to convey values on the lines. System performance may suffer from one or a combination of these factors.

The trace buffer 350 may also correspond to data storage for trace history and bus event statistics used for debug purposes. The trace buffer 350 may include entries 352a-352q. Unlike the physical partitions within the trace buffer 340, the trace buffer 350 does not include static partitioning. Each one of the entries 352a-352q may be allocated for use in each clock cycle by any of the M buses. However, after the debug trace information is collected, reading out the information, separating the information based on bus type, and analyzing the information may be difficult. The amount of information for different bus types may vary. The timestamp information may not be stored on a bus type basis, but rather on a basis of accessing the trace buffer 350.

Figure 5:
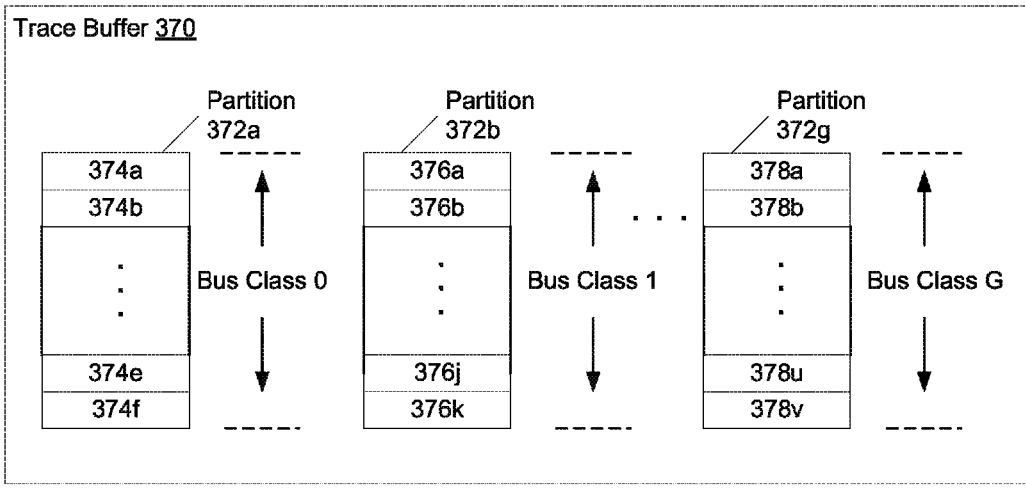
FIG. 5 is a generalized block diagram of another embodiment of trace data storage allocations.

Turning now to FIG. 5, a generalized block diagram illustrating another embodiment of trace data storage allocations 360 is shown. The trace buffer 370 may correspond to data storage for trace history and bus event statistics used for debug purposes. The trace buffer 370 may include physical partitions 372a-372g. The trace buffer 370 may include a dedicated physical partition for each of G bus classes at a coherence point on a semiconductor chip. The number of G bus classes is less than the number M buses at the coherence point. Referring again to FIG. 2, there may be 7 buses at the coherence point and there may be 3 bus classes as shown earlier in Table 1. In various embodiments, each of the physical partitions 372a-372g is a separate RAM. The partition 372a may include entries 374a-374f. The partition 372b may include entries 376a-376k and the partition 372g may include entries 378a-378v. In some embodiments, each of the partitions 372a-372g may have an equal number of entries.

The trace buffer 370 may be partitioned on a bus class basis. For example, the entries 374a-374f within the partition 372a may correspond to bus class 0. Similarly, the entries 376a-376k within the partition 372b may correspond to bus class 1, and entries 378a-378v within the partition 372m may correspond to bus class G. In some embodiments, the assignments of bus classes to physical partitions may be done once by designers and it is set for the debugging process. In other embodiments, the assignment of bus class to physical partition is programmable and may change for different debug trace collections.

Figure 6:
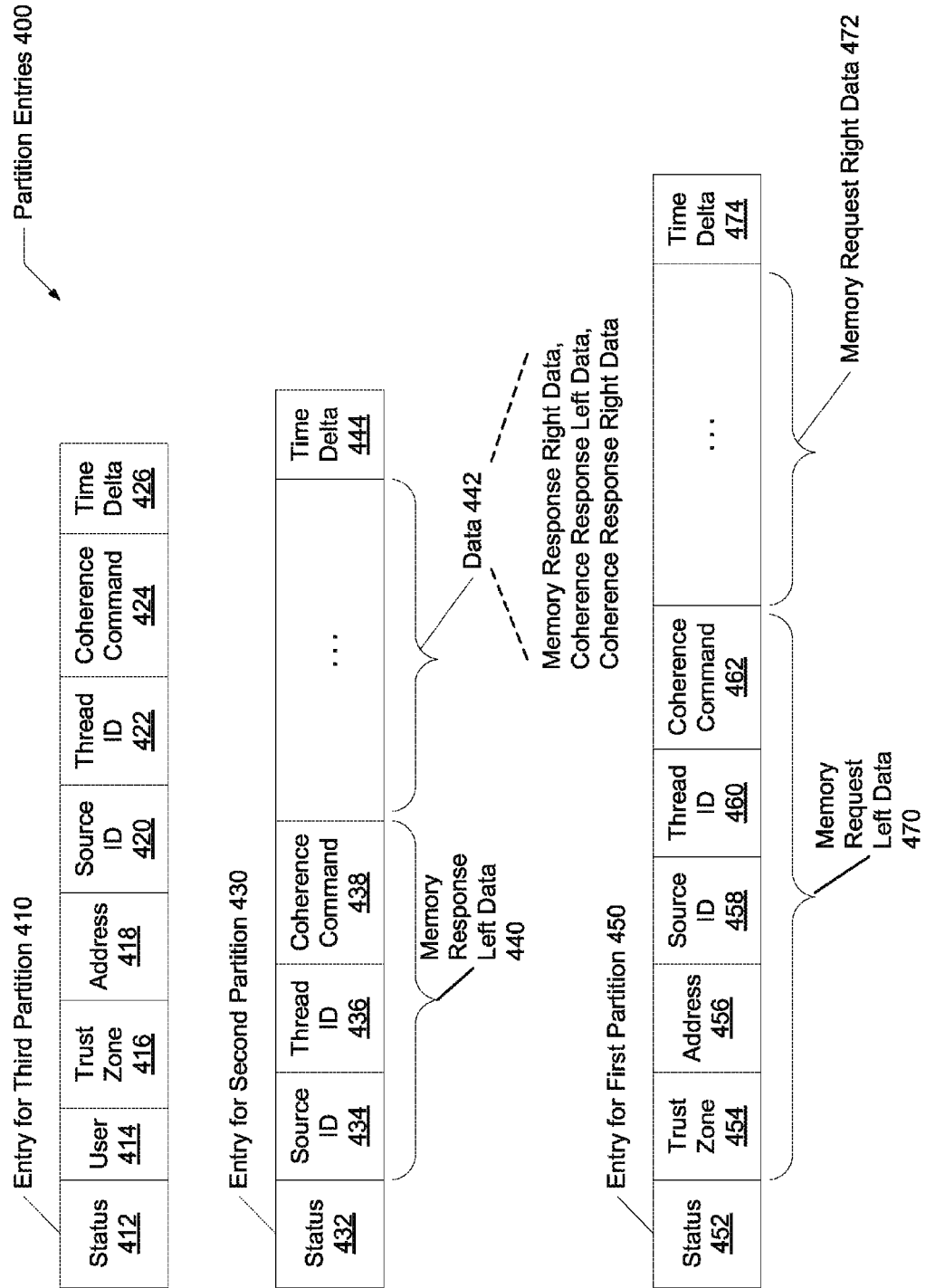
FIG. 6 is a generalized block diagram of one embodiment of physical partition entries.

Referring now to FIG. 6, a generalized block diagram of one embodiment of physical partition entries 400 is shown. In some embodiments, the trace buffer may be divided into a number of physical partitions equal to a number of bus classes to monitor at a coherence point. For example, there may be 3 bus classes to monitor as previously shown in Table 1. Beginning with the third partition assigned to a coherence command bus class, the entry 410 for this partition may include multiple fields. The status field 412 may include a valid bit to indicate the entry 410 stores valid trace information. The user field 414 may indicate a source that generated the coherence command. The trust zone field 416 may indicate a trust zone mapping. The trust zone mapping may define multiple separate address ranges defined by programmable configuration registers. The address ranges may correspond to different IC designs on the SOC. The mappings may have an arbitrary size and are located on any arbitrary page aligned boundary as defined by base and size registers. After initialization by boot firmware, particular configuration registers corresponding to the trust zone mappings may define regions in the off-chip DRAM that are only accessible by transactions with the respective trust zone mapping value.

The address field 418 may include an address corresponding to a cache block with a requested cache coherence state. The source identifier (ID) field 420 may identify the functional block within the semiconductor chip that has a local cache copy of the cache block associated with the address in the address field 418. The functional block may be an IC device on a SOC. The thread identifier (ID) field 422 may identify a software thread of an application. The coherence command 424 may identify a cache coherence command. Some examples of the commands may include a cache line read for ownership command, a cache line read for shared command, and a cache line invalidation command. The time delta field 426 may store a timestamp value measuring a time duration since a last update to the third partition within the trace buffer.

The second partition may be assigned to memory responses and coherence responses. Each of these responses may include response traffic on symmetric left and right buses. Therefore, there may be four buses within this bus class. The entry 430 for the second partition within the trace buffer may include fields 432-444. The status field 432 may include a valid bit for each one of the four response buses. The fields 434-438 may store information as described for fields 420-424. The fields 434-438 may store data 440 associated with the memory response left bus within the bus class. The data 442 may store information in fields similar to fields 434-438, but for the memory response right bus, the coherence response left bus, and the coherence response right bus. Similar to the field 426, the time delta field 444 may store a timestamp value measuring a time duration since a last update to the second partition within the trace buffer.

The first partition may be assigned to memory access requests. Each of these responses may include response traffic on symmetric left and right buses. Therefore, there may be two buses within this bus class. The entry 450 for the first partition within the trace buffer may include fields 452-474. The status field 452 may include a valid bit for each one of the two request buses. The fields 454-462 may store information as described for fields 416-424. The fields 454-462 may store data 470 associated with the memory request left bus within the bus class. The data 472 may store information in fields similar to fields 454-462, but for the memory request right bus. Similar to the field 426, the time delta field 474 may store a timestamp value measuring a time duration since a last update to the first partition within the trace buffer.

Figure 7:
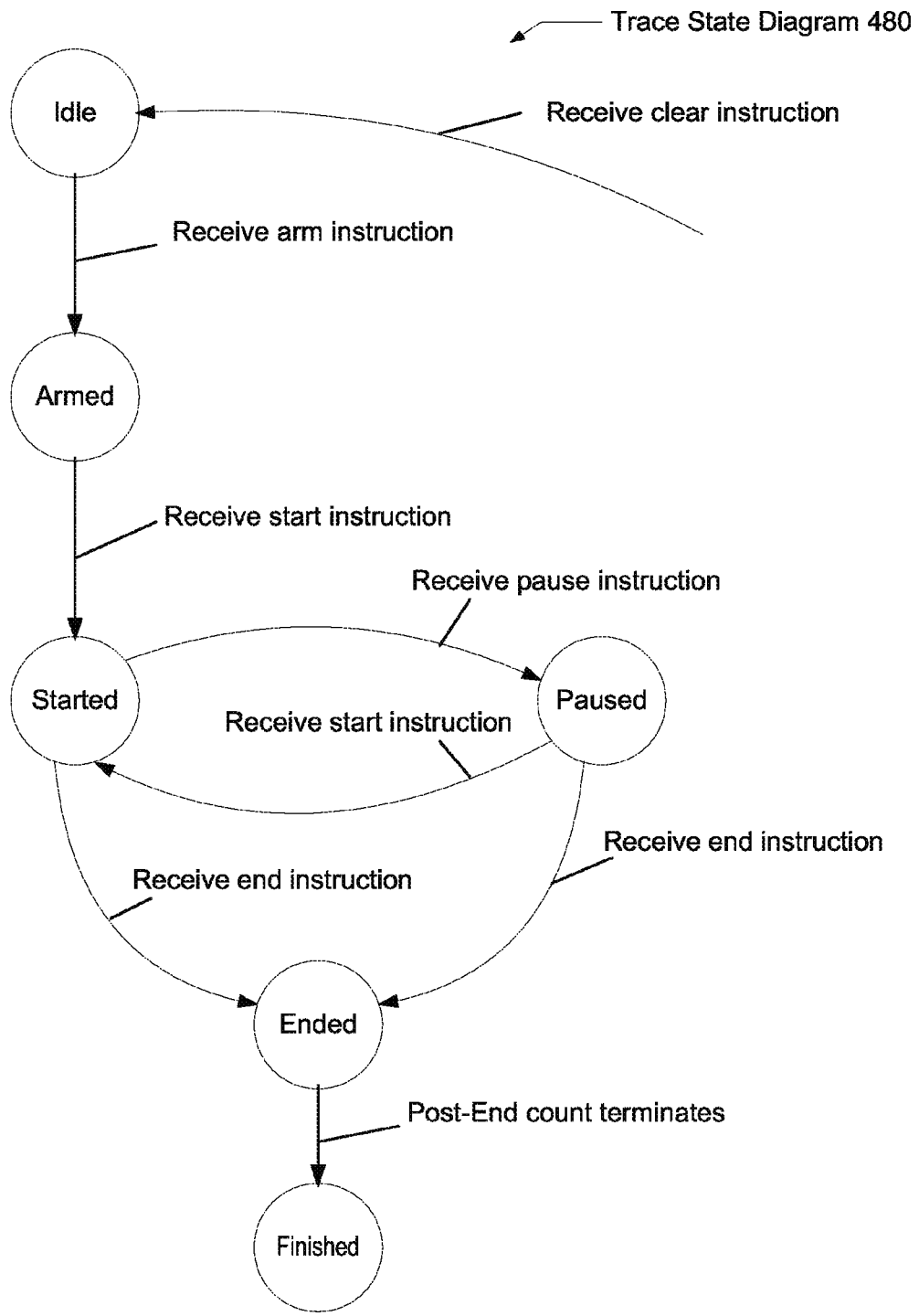
FIG. 7 is a generalized block diagram of one embodiment of a trace state diagram.

Turning now to FIG. 7, a generalized block diagram of one embodiment of a trace state diagram 480 is shown. A trace unit, such as the trace unit 140 in the SOC 100, may use the state diagram 400 for capturing trace history and bus event statistics. In the embodiment shown, the state diagram 400 uses the status states Idle, Armed, Started, Paused, Ended, and Finished. As shown, the state diagram 400 may receive multiple instruction types, such as at least Clear, Arm, Start, Pause, and End.

As described earlier, while monitoring bus traffic on a given bus or buses within a bus class, a given bus event filter within the trace unit may determine particular qualifying conditions are satisfied, which yields a valid trace instruction to execute and possibly a bus transaction to record. The bus event filter may have corresponding configuration registers programmed with a particular trace instruction. This instruction may be executed in response to determining the qualifying conditions are satisfied. Based on the state diagram and the trace instruction, the trace history may be recorded in trace storage, such as the trace buffer with multiple physical partitions. In addition, bus event counts may be incremented and stored in registers. These registers may be read out both during the collection of the trace history and at a later time after the collection of the trace history. As described earlier, the JTAG interface, a PIO access, or other mechanism may be used to read these registers.

The Clear instruction may clear trace state, pointers, statistics counters and other information. The trace unit may move to an Idle status state in response to the clear instruction being executed. The Arm instruction may be used to put the one or more bus event filters in the trace unit in an Armed status state. The one or more bus event filters within the trace unit may be ready to begin filtering bus traffic on assigned buses or bus classes. The Start instruction may place the trace unit in a Started status state and trace history, bus event statistics, or both may be collected. In some embodiments, the trace history information may also be stored in the trace storage in response to both the Started status state and determining qualifying conditions are satisfied. The bus event statistics, such as counts, may be stored in registers. For example, the logic within a bus event filter may determine a match occurs between values in the bus traffic on the bus or the bus class being monitored and values stored in corresponding configuration registers. In other embodiments, the trace history information may not yet be stored until a Write Bus or similar instruction is executed after the Start instruction.

The Pause instruction may place the trace unit in a Paused status state, wherein the capture of traces and bus event statistics may be suspended. The End instruction may place the trace unit in an Ended status state causing the collection of trace history, bus event statistics, or both to stop. Monitoring bus traffic and determining whether valid transactions have occurred through qualifying conditions being satisfied may also occur when entering the Paused and Ended status states.

In addition, entering the Paused and Ended status states may occur either immediately or be delayed. For example, as shown for the Ended state, a post-End count may occur before the trace unit enters a Finished state and trace data collection is actually stopped. After entering the Ended state, a counter may decrement from a programmable value for each clock cycles, such as the clock cycles used in the high-level interconnect, or fabric, of the SOC. In response to the counter decrementing to a reset value, collection of trace information may be done and the state diagram 400 moves from the Ended state to the Finished state. Alternatively, the counter may increment from a reset value to a programmable end value.

A similar counting or delaying mechanism may be used for each of the states in the state diagram 400. Additionally, for the Ended state, in some embodiments, further conditions may be used to stop collection of trace information. For example, even if the counter has not yet reached the reset value when decrementing, if a particular percentage of the trace storage is written after entering the Ended state, then collection may stop. In one example, the percentage may be half of the trace storage.

In some embodiments, the trace storage may be a logical single buffer, but include multiple physical buffers or physical partitions. In various embodiments, each separate buffer, or physical partition, is a random access memory (RAM). Each separate physical partition within the trace buffer may be used to capture trace history and bus event statistics for particular buses or bus classes. In some embodiments, the delaying and stopping of actions for a given state in the state diagram 400, such as the Ended state, may be applied to each of the separate partitions. In other embodiments, the delaying and stopping of actions may be customized for each of the separate partitions. Similarly, in some embodiments, the states in the state diagram 400 are used for each of the separate physical partitions. In other embodiments, more complex control logic may be used and a modified state diagram may be simultaneously used for one or more of the separate physical partitions.

Figure 8:
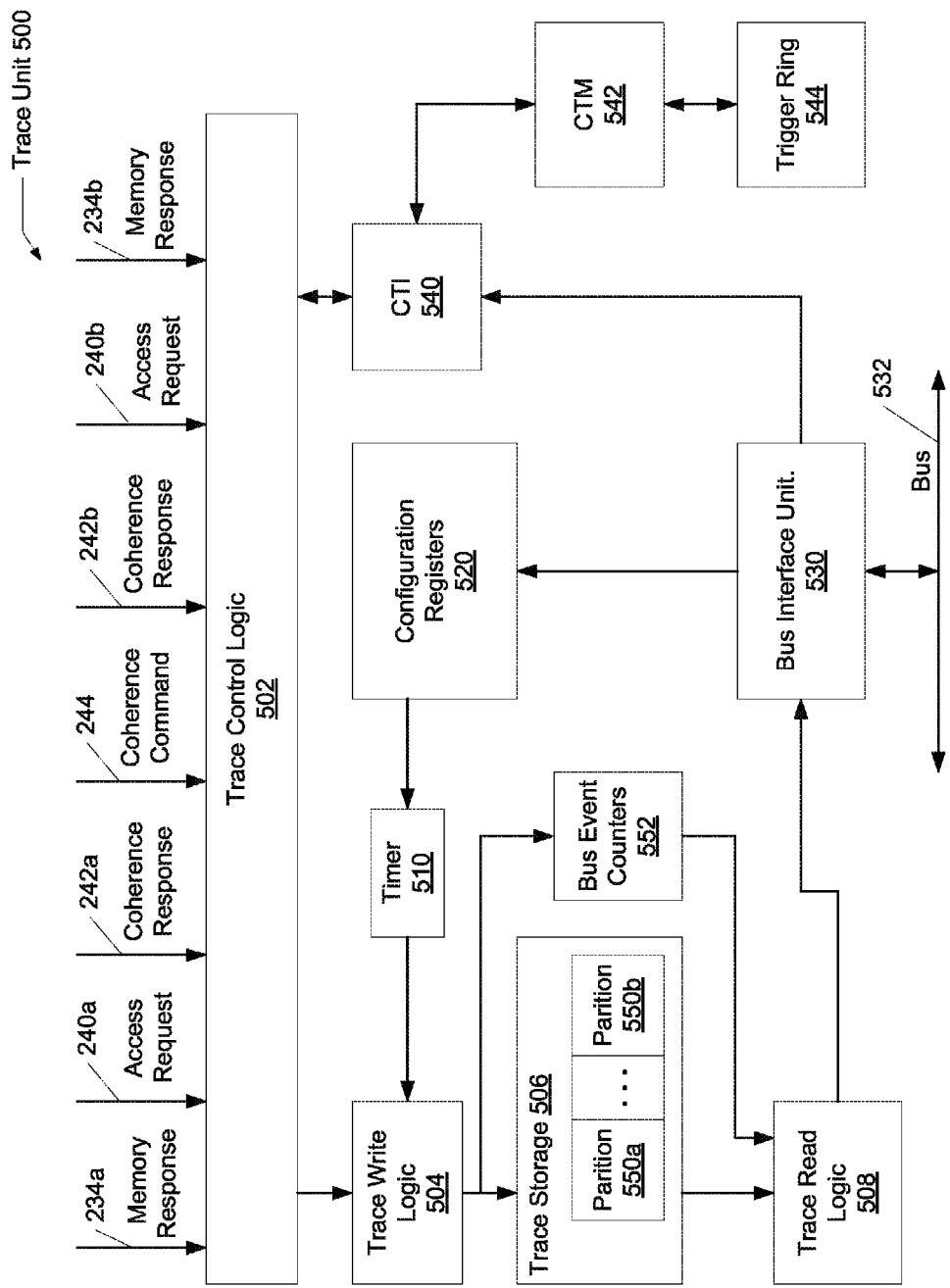
FIG. 8 is a generalized block diagram of one embodiment of a trace unit.

Turning now to FIG. 8, a generalized block diagram of one embodiment of a trace unit 500 is shown. Bus signals described earlier are numbered identically. In one embodiment, the one or more buses being monitored for debugging purposes are sent to the trace control logic 502. In various embodiments, the buses 234a-234b, 240a-240b, 242a-242b, and 244 are sent to the trace control logic 502. The logic 502 may determine when a valid transaction occurs on a given bus and what action to take in response to the determination. In some embodiments, a trace instruction is used to determine the action to take. The valid transactions to track and the taken actions may be determined based on at least the values stored in the configuration registers 520, the trace state diagram, and the values found in the bus traffic.

The configuration registers 520 may be programmed with values through the bus 532 and the bus interface unit 530. In some embodiments, the bus 532 is the Advanced Peripheral Bus (APB) that is part of the Advanced Microcontroller Bus Architecture (AMBA) provided by ARM Holdings PLC and used as the on-chip bus in system-on-a-chip (SOC) designs. The AMBA protocol is an open standard, on-chip interconnect specification for the connection and management of functional blocks on a SOC.

The trace write logic 504 may be used to send one or more of trace history, a global time-base count, and local timestamps to the trace storage 506 in response to the trace logic 502 detects a valid transaction on a given bus and the state diagram, such as the state diagram 480 in FIG. 7, for the trace unit 500 is in a state that performs updates. For example, a Write Bus or other storage operation may have been executed after the Started trace instruction has been executed. The timer 510 may be used to enable the write transactions into the trace storage 506, such as qualifying write word line drivers. In addition, the timer 510 may include logic to create the global time-base count and the local timestamp. In addition, the trace write logic 504 may be used to send an indication to the bus event counters 552 for updating one or more bus event counters associated with the qualified bus events determined by the bus control logic 502.

The trace storage 506 may include multiple separate physical partitions 550a-550b, such as RAMs. Each separate one of the partitions 550a-550b may be used to capture trace history for one or more assigned buses at the coherence point. Therefore, each separate one of the partitions 550a-550b may be used to capture trace history for different bus events, such as memory access requests, memory responses, cache coherent requests, and cache coherent responses.

In various embodiments, each one of the separate partitions 550a-550b may have a same number of entries, but the entries may have a different size based on the partition and bus class assignment. The stored information may include status information, timestamp information, and bus field information. The bus field information may be used for comparison sake by the trace control logic 502 to determine whether or not to record information in the trace storage 506. Based on the bus class type, different fields may be stored. For example, the bus fields to monitor, maintain statistics, and possibly store may include an IC device identifier (ID), a thread identifier (TID), an address, a trust zone mapping, and a coherence command. Therefore, in one example, the trace storage 506 may include three separate RAMs. The three RAMs may be assigned to bus classes as previously shown in Table 1. In some embodiments, each of the three RAMs may include 400 entries. However, a first RAM may be used for memory access requests and include 140 bits per entry. Each entry may be able to store each of the listed bus fields.

Continuing with the above example, a second RAM may be used for both memory responses and cache coherent responses. The second RAM may include 108 bits per entry. Each entry may be able to store each of the listed bus fields excluding the trust zone mapping and the address. A third RAM may be used for cache coherent requests or commands and include 85 bits per entry. Each entry may be able to store each of the listed bus fields. In some embodiments, the entries in the three RAMs may include the fields previously shown and described in the entries 410-450 in FIG. 6. Other combinations of the number of entries and the size of the entries for the separate partitions 500a-550b are possible and contemplated.

In addition, left and right buses may or may not be used for traffic flow and the amount of information stored in a particular entry may be accordingly adjusted. Further, the trace control logic 502 and the trace write logic 504 may determine a qualified update for the trace storage 506 may not occur. However, a qualified update for the bus event counters 552 may occur. Bus event statistics alone may be updated with no updates for the trace history.

In various embodiments, the bus event counters may store bus event counts over a much larger time period than the trace storage 506 stores trace history. For example, each of the physical partitions within the trace storage 506 may include 400 entries for storing trace history. Each of the bus event counters may include 24-bit registers capable of storing over 16 million counts of bus events. The physical partitions within the trace storage 506 may fill far sooner than the bus event counters reach a maximum count value. Therefore, after storage of the trace histories ends, the bus event counts may still continue to be stored for a long time period.

A trace instruction may be used to determine what action to take regarding collecting traces when particular qualifying conditions are satisfied for a bus event on a given bus. The trace control logic 502 may utilize the state diagram 400 and may receive multiple instruction types, such as at least Clear, Arm, Start, Pause, and End. One action is to write a trace into the trace storage 506, thereby, utilizing the trace write logic 504, the timer 510, and the trace storage 506.

Prior to the execution of the trace instruction, when the particular bus event qualifying conditions are satisfied, a count may be updated for the bus event(s). The count or counts may be stored in corresponding registers, which may be read out at a later time. As described earlier, the JTAG interface, a PIO access, or other mechanism may be used to read these registers. In addition, time-base values may be written into the time storage 506 during any write operations for the trace storage 506. Write operations may occur during the Started state and also during the delays for other states, such as the Ended state.

A pointer may be maintained to indicate the last row in a given one of the partitions 550a-550b written with valid trace information. Another pointer may be maintained to indicate the first row written with valid trace information. The pointers may be used to determine whether recording of the trace information stopped before the partition filled or the recordings wrapped around the partition. The pointer positions may be used when the trace information is read out to reassemble the trace information. The trace read logic 508 may be used to read out trace information from the trace storage 506 for debugging purposes. The read out information may be sent to the bus 532 through the bus interface unit 530.

In addition to the two above pointers, two additional pointers may be used for the locations of the first entries to be updated after the Start and End instructions. A time counter may be used to track the elapsed time between trace information updates in the entries of the trace storage 506. Separate pointers and time counters may be used for each one of the partitions 500a-550b. In some embodiments, the time counter may clear after an update of an entry of a corresponding partition and increment at each clock cycle of the high-level interconnect of the SOC, or the fabric. In addition, time stamps maybe stored in the entries of the partitions 550a-550b.

In various embodiments, the trace unit 500 includes testing logic and interfaces for external agents. For example, cross-trigger mechanisms are typically used during debugging of multiple embedded cores, such as the multiple IC devices on a SOC. The cross-trigger mechanism triggers activities in one debug entity from debug events occurring in another debug entity. The cross-triggers may be related to certain inter-core transactions or bus traffic transactions. The cross-trigger mechanism typically uses a trigger source that generates a trigger event when certain conditions are fulfilled and a trigger target that performs debug actions. Additionally, the cross-trigger mechanism uses a trigger event delivery mechanism to send the trigger event from the trigger source to the trigger target. Dedicated interconnects transfer the debug events.

One example of a cross-trigger mechanism is the ARM® CoreSight debug architecture that includes one or more cross-trigger interface (CTI) blocks and a cross-trigger matrix (CTM). In various embodiments, the trace unit 500 may use this architecture for additional debugging purposes. The CTI 540 combines and maps trigger requests from an embedded core or an associated embedded trace module (ETM). The CTI 540 also broadcasts these requests to other CTI blocks. The CTM 542 may include interconnects for connecting multiple CTIs together and other debug sites. The trigger ring 544 represents the other multiple CTIs and the other debug sites. In this manner, the debug architecture passes trigger events from one embedded core to another. The trigger ring 544 may be handled by the trace control logic 502 as another event filter capable of determining valid bus transactions and in response to this determination providing an action to take.

Figure 9:
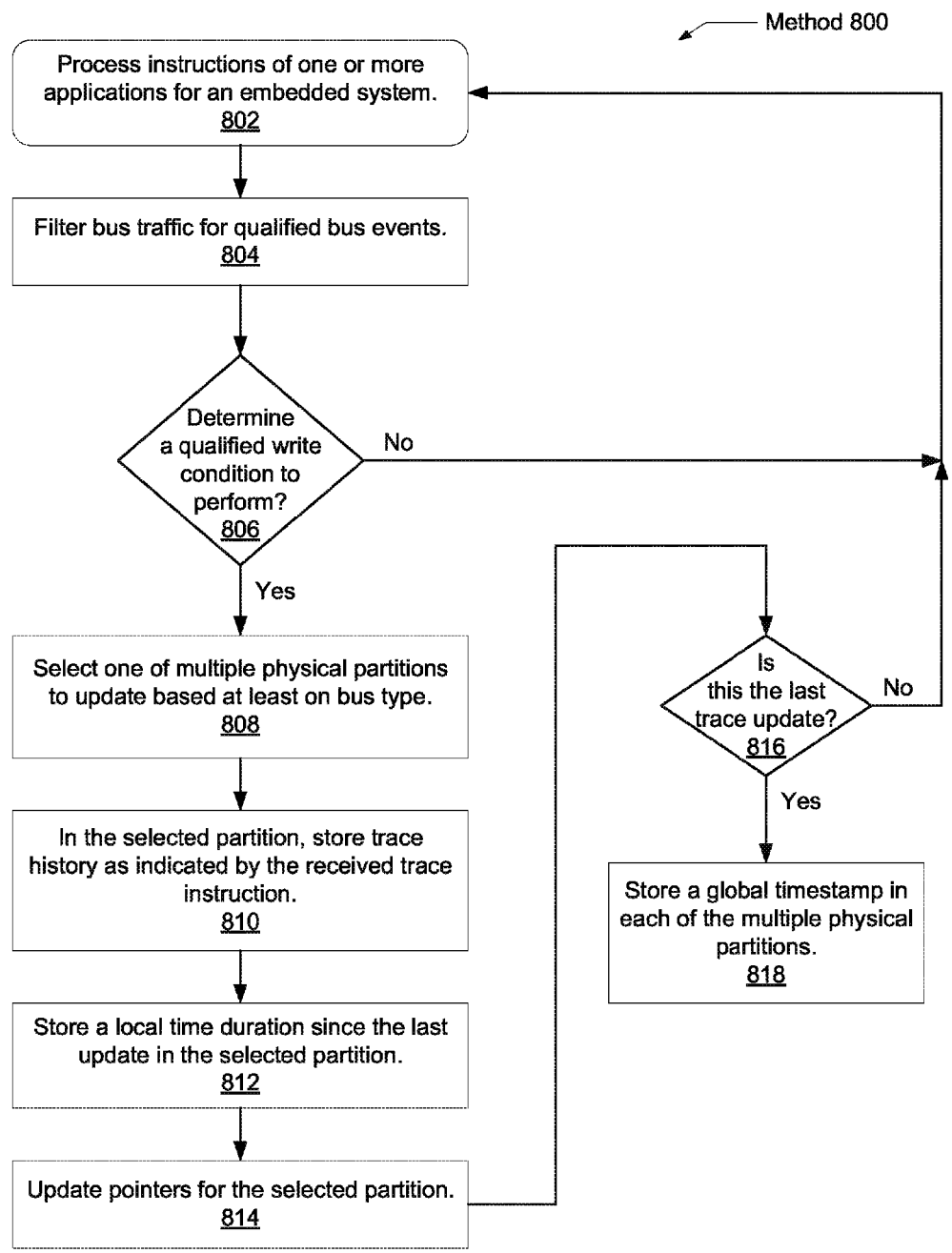
FIG. 9 is a generalized flow diagram of one embodiment of a method for updating trace data storage with multiple physical partitions on an integrated circuit.

Referring now to FIG. 9, a generalized flow diagram illustrating one embodiment of a method 800 for updating trace data storage with multiple physical partitions on an integrated circuit is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 802, an integrated circuit processes instructions of one or more applications. In various embodiments, the integrated circuit is an embedded system, such as a system-on-a-chip (SOC). In block 804, selected bus traffic may be filtered for qualified bus events. The bus traffic at a global ordering point on the chip, such as a coherence point, may be selected. Bus event filters may monitor the bus traffic. The bus event filters may have been previously assigned to a particular bus or bus class. Comparisons and filtering logic may be used to determine whether qualified bus events have occurred. For example, one or more of an IC device identifier (ID), a thread identifier (TID), an address, a trust zone mapping, and a coherence command may be compared to values stored in configuration registers associated with a given bus or bus class.

The bus event filtering logic may determine a qualified write condition occurs for the trace storage. The following conditions may be satisfied, but the priority may be set in any order. First, one or more bus event filters may have determined a qualified bus event has occurred. Second, the state of the trace control logic may have already entered a Started state. Third, a Write Bus or similar trace instruction may be executed now or has been executed. The Write Bus trace instruction may indicate whether a trace history or bus event statistics are to be stored in the trace data storage. Fourth, the trace logic is not in an Ignore state. A determination may be made whether to delay tracing according to a programmable time duration. There may be bus events to ignore after certain conditions such as a system reset. After entering the Started state, a counter may decrement from a programmable value for each clock cycle, such as the clock cycles used in the high-level interconnect, or fabric, of the SOC. In response to the counter decrementing to a reset value, collection of trace information may begin. Alternatively, the counter may increment from a reset value to a programmable end value. In some embodiments, the programmable delay is not used for external debug agent bus events, such as CTI bus events.

Continuing with a list of qualifying conditions for a write or update operation of the trace data storage, a fifth condition may include the trace control logic is not in a Paused state, wherein updates to the trace data storage are paused or suspended. In embodiments where the Paused state only suspends updates to counts of bus events, the trace data storage may still be written if a Write Bus or similar trace instruction is received to be executed or has already been executed. Sixth, the trace control logic has not already entered an End state and finished updating the trace data storage. In various embodiments, the qualifying write conditions may not be satisfied, and accordingly the trace storage is not updated. However, the bus event counters may be updated in response to at least the above first and second conditions are satisfied.

If the bus event filtering logic determines a qualified write condition occurs (conditional block 806), then in block 808, control logic may select which one of multiple physical partitions within a trace data storage to update based at least on bus type. Referring again to FIG. 5, the trace control logic 502 and the trace write logic 504 may determine which one of the physical partitions 550a-550b within the trace data storage 506 to update. For example, bus-to-physical-partition assignments may be set as previously shown in Table 1. In some embodiments, these assignments are permanently set. In other embodiments, the assignments may be dynamic and programmable. In various embodiments, the physical partitions are separate RAMs.

In block 810, the selected physical partition within the trace buffer may be updated with the current trace history corresponding to bus events that are both indicated in the programming of the bus event filters and detected in the bus traffic. The entries within the selected physical partition may have a fixed format as previously shown with entries 410-450 in FIG. 6. In block 812, a local time duration may be stored in the selected physical partition. The local time duration may be measured from the last update in the selected partition. In various embodiments, each one of the separate physical partitions includes an associated time counter used to track the elapsed time between updates of entries within the physical partition. These time counters may clear after each update of an entry for the associated physical partition and increment at each clock cycle of the clock signal used within the high-level interconnect, or fabric, of the semiconductor chip.

During typical operation, the local time counters may saturate and not clear until an update of the next entry within the associated physical partition. However, in some embodiments, a full tracking mode may be available. A bit within control logic may be used to distinguish between full tracking mode and normal mode. For the full tracking mode, the local time counter may not saturate. Rather, the local time counter may stop counting one count prior to saturation. For example, a 16-bit counter may reach the hexadecimal value 0×FFFE. At this time, other fields within the entry of the physical partition may be written with a given value, such as all zeroes.

The clearing of the valid bits may distinguish the update prior to saturation in the full tracking mode from a typical update. Since the last valid write pointer does not match the address of these writes, this update may be differentiated from a global timestamp update that occurs at the end of a trace. Further details of the global timestamp and the steps used at the end of a trace are further described later. During a next update after the local counter stores the value 0×FFFE in the entry, the local counter is cleared and used to update the next entry. Not saturating the counter and writing the remainder of the entry with a given value may track a number of times the local time counter would saturate.

In block 814, one or more pointers may be updated for the selected partition. For the selected partition, a first pointer may indicate the first entry, or row, that stores valid trace information. The selected partition may include a second pointer indicating the last entry, or row, that stores valid trace information. The first and the second pointers may provide differentiation between the occurrences that the trace was stopped before the physical partition filled and that the trace was stopped after the physical partition is wrapped around with updates. In addition, the first and the second pointers allow the stored trace information to be reassembled and understood when the information is read out from the physical partition.

There may be a third pointer indicating the entry, or row, corresponding to the Start trace instruction is received and executed. There may be a fourth pointer indicating the entry, or row, corresponding to the End trace instruction is received and executed. For each of these pointers, the values may be updated if there are delays used for the Start and the End instructions. In other embodiments, more pointers may be used to differentiate when these instructions are received and when respective delays are completed and the instructions are actually executed. For blocks 810-814, the trace write operations may update respective entries with trace history and/or bus event statistics, update respective entries with local time counts, and update local pointers within a clock cycle. Additionally, for blocks 810-814, only the selected physical partition may be updated. The write logic signals, such as word-line drivers, write enables, write data lines, and pointer and time counter updates may remain deasserted and unchanged for non-selected physical partitions. Therefore, power consumption for write accesses may be reduced for the trace buffer.

An End trace capture instruction may be received by the trace control logic in the trace unit. A post-End count may occur before the trace unit enters a Finished state and trace data collection is actually stopped. If the post-End condition is not satisfied, then trace history and bus event statistics may continue to be captured and stored until the post-End condition is satisfied. If the tracing is ending now and the post-End tracing condition is satisfied, then the collection and the storage of the trace information may end. If the current trace write operation is the last trace update (conditional block 816), then a corresponding entry in the selected physical partition may be updated with the trace information. Following, in block 818, a global timestamp may be stored in each of the multiple physical partitions.

The trace unit may contain a dedicated global time-base counter. The global time-base counter may be updated directly or loaded with a value stored in a programmable configuration register. In some embodiments, the global time-base counter begins counting as soon as it is loaded with a value. The global time-base counter may increment each clock cycle of the clock signal used in the fabric of the semiconductor chip. The global time-base counter may have a larger size than the local time counters for the physical partitions. For example, the local time counters may include 16 bits, whereas the global time-base counter may include 64 bits. The global time-base counter may rollover when it saturates. The global time-base counter value written into the physical partitions may be the time the last written update occurred, even if this update occurred prior to the End trace instruction. The address of the global time-base counter value written into the physical partitions may be the last valid write pointer value.

Figure 10:
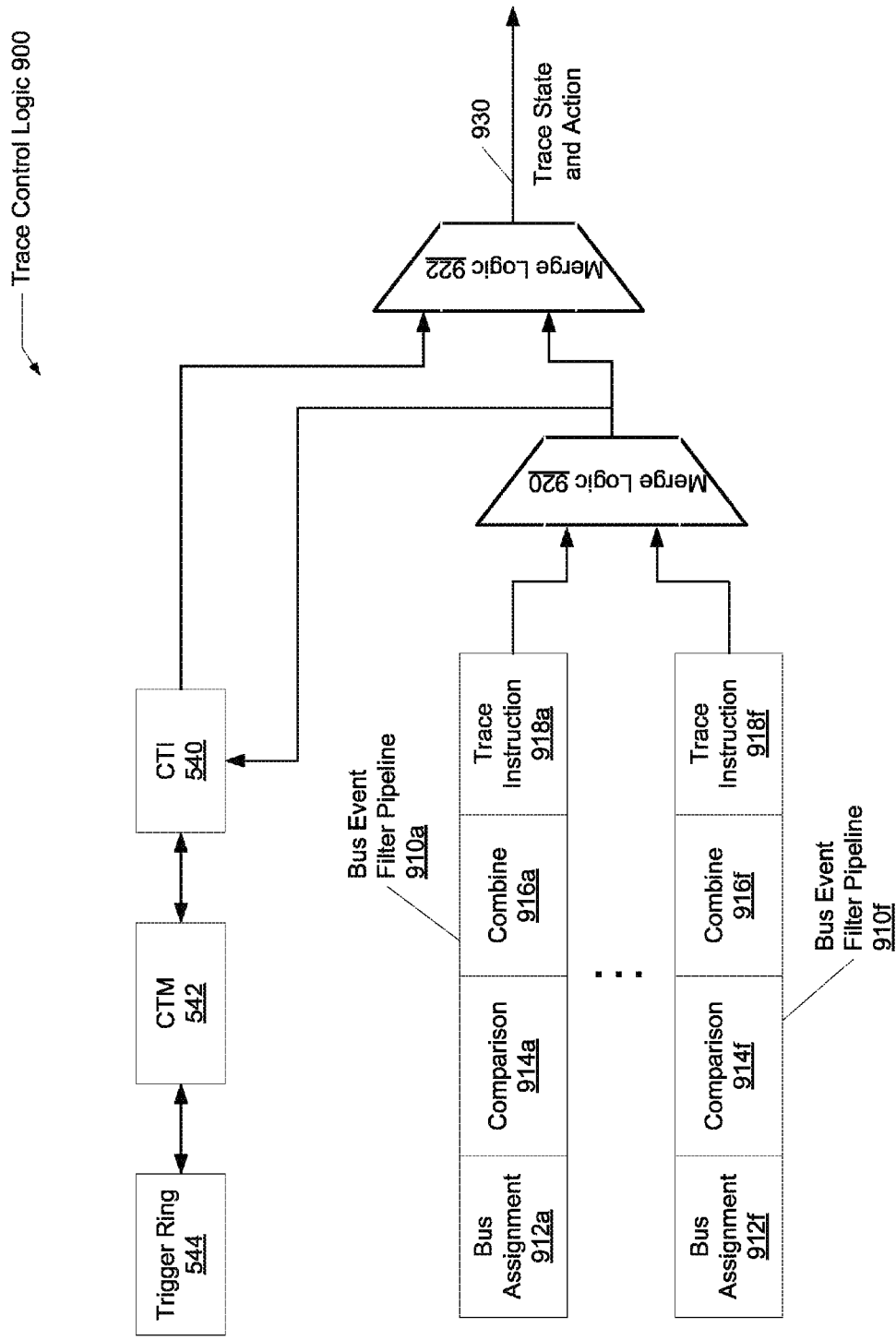
FIG. 10 is a generalized block diagram of one embodiment of trace control logic.

Turning now to FIG. 10, a generalized block diagram of one embodiment of trace control logic 900 is shown. Circuitry and logic described earlier are numbered identically. In various embodiments, the trace unit may include one or more bus event filter pipelines such as pipelines 910a-910f for controlling the collection of trace history and bus event statistics at a coherence point in the design of an integrated circuit. In various embodiments, the bus event filter pipelines 910a-910f process data in bus traffic in multiple clock cycles. In other embodiments, the bus event filter pipelines 910a-910f process data in bus traffic in a single clock cycle. The bus event filter pipelines 910a-910f may also be referred to as bus event filters 910a-910f. In some embodiments, the integrated circuit is a system-on-a-chip (SOC). The pipelines 910a-910f may be configurable through programmable configuration registers. A given one of the event filter pipelines, such as pipeline 910a, may have a bus assignment stage 912a, a comparison stage 914a, a combine stage 916a, and a trace instruction 918a. Similarly, the event filter pipeline 910f includes stages 912f-918f.

The assignment stage 912a may be used to assign the event filter pipeline 910a to a particular bus or bus class. Referring again to FIG. 5, in one embodiment, the buses 234a-234b, 240a-240b, 242a-242b, and 244 are sent to the trace control logic 502. One or more of these buses may be combined in a bus class. The trace control logic 900 may illustrate one embodiment of the control logic used for the received bus traffic on the buses 234a-234b, 240a-240b, 242a-242b, and 244. Programming the configuration registers may be done to set the assignment for one or more of the event filter pipelines 910a-910f. Each one of the event filters 910a-910f may be assigned to any bus class, including multiple event filters assigned to a single bus class. However, any given one of the event filters 910a-910f may not be assigned to multiple bus classes. Additionally, the assignment stages 912a and 912f may include assignments to a given one of physical partitions within a trace buffer.

Programming the configuration registers may set the values that are compared against in the comparison stage 914a and the combination formulas to use in the combine stage 916a. Additionally, the trace instruction type for the event filter pipeline may be set by programming the configuration registers. The bus traffic may include particular fields used in the comparison stage, such as stage 914a of the event filter pipeline 910a. Some examples of the monitored fields may include an IC device identifier (ID), a thread identifier (TID), an address, a trust zone mapping, and a coherence command.

Other examples of fields to monitor and compare against stored values in configuration registers are possible and contemplated. Fields such as the address and trust zone mappings may have absolute values. Fields such as the ID and TID may have encoded values. Fields such as the coherence command field may be fully enumerated. The coherence command field may be expanded to be an un-encoded single bit per command. Each bit position may be associated with a given coherence command. For example, a multi-bit vector may be used, wherein bit position 1 of the vector corresponds to a cache line read for ownership coherence command. Bit position 5 of the vector may correspond to a cache line read for shared coherence command, bit position 21 may correspond to a cache line invalidation coherence command, and so forth. To track a particular coherence command, in some embodiments, the associated bit position is asserted in the corresponding configuration register. Simultaneously monitoring multiple coherence commands may be allowed. Setting multiple bits within the enumerated vector may perform simultaneous monitoring of multiple commands.

The particular fields, such as the ID, TID, address, trust zone mapping, and coherence commands, to use for comparisons may additionally depend on the bus type being monitored and other qualifying values, such as a valid or enabled bit. Unqualified fields may be treated as a don't-care value in Boolean logic. The field positions within the bus traffic may be known and used for the comparisons. For example, for each of the buses, a first field position may be the TID field and it is compared to a TID value stored in the configuration registers. For each of the buses, the second field position may be the ID field and it is compared to an ID value stored in the configuration registers, and so forth. For bus classes, each bus within the class may be monitored for a given bus event and if any one of the buses within the class has a match for the bus event, then a valid bus event has occurred and the result is sent to the combine stage of the event filter pipeline.

Table 2 below illustrates one embodiment of representing the bus fields and positions used for comparing against values stored in configuration registers in the compare stage within an event filter pipeline. For bus traffic on the access request buses 240a-240b and the coherence command bus 244, the third field position may be a concatenation of the trust zone mapping and the address fields. Comparisons for the coherence command on the bus traffic of any bus may not use enable or valid bits, since the coherence command field is enumerated.

TABLE 2

| Bus Traffic Comparison Monitoring | |
|---|---|
| Field Position [i] | Bus Field [i] |
| 3 | {Trust Zone, Address} |
| 2 | IC Source ID |
| 1 | Thread ID |
| 0 | Enumerated Coherence Command |

Following the comparison stage is the combine stage, such as the combine stage 916a for the event filter pipeline 910a. The combine stage provides flexibility for determining which bus events or combinations of bus events cause a trace history to be stored, which statistics to collect and store, or both. Programming a given configuration register may change a formula for determining the combinations. For example, a combiner configuration register may include a multi-bit vector, wherein a set of bits may correspond to multiple bus fields within bus traffic on an associated bus. The stored values in the combiner configuration register may be sent to combinatorial logic that implements formulas for defining the valid combinations of bus events.

Table 3 below illustrates one embodiment of representing bus event combining formulas in a combiner configuration register. In some embodiments, the number of bits in the combiner configuration register may be proportional to at least a number of fields to monitor and compare on the buses, whether inverted values of matches are used, and a number of functions to use in the formulas. For example, in Table 3, 4 fields are monitored and compared on the buses, inverted match values are used (2 values are used), and 2 Boolean functions (AND, OR) are used, which yields 16 bits for the combiner configuration register, or 4×2×2=16.

TABLE 3

Bus Event Combining Formulas

| Function | Combiner Configuration Register Bit | Compare Result Register Bit | Matching Result Polarity | Description |
|---|---|---|---|---|
| AND | 15 | 3 | Inverted | For every set register bit, the condition must be true. If any condition is not true for any set bit, then the AND function result is not true. |
|  | 14 | 2 |  |  |
|  | 13 | 1 |  |  |
|  | 12 | 0 |  |  |
|  | 11 | 3 | Non-Inverted |  |
|  | 10 | 2 |  |  |
|  | 9 | 1 |  |  |
|  | 8 | 0 |  |  |
| OR | 7 | 3 | Inverted | For at least one set register bit, a condition must be true. If all conditions are not true for the set bits, then the OR function result is not true. |
|  | 6 | 2 |  |  |
|  | 5 | 1 |  |  |
|  | 4 | 0 |  |  |
|  | 3 | 3 | Non-Inverted |  |
|  | 2 | 2 |  |  |
|  | 1 | 1 |  |  |
|  | 0 | 0 |  |  |

The four bits in the Compare Result Register in the third column of Table 3 may correspond to the four field positions shown in Table 2. The bit position 0 of the Compare Result Register may correspond to a match value associated with the field position 0 holding the enumerated coherence command. The match value may be found by comparing the enumerated coherence command vector stored in a configuration register with the enumerated coherence command vector in the field within the bus traffic being monitored. Similarly, the bit position 1 of the Compare Result Register may correspond to a match value associated with the field position 1 holding the thread ID, and so forth. The match values may be found during the compare stage of the event filter pipelines. The selection of which bits within the combiner configuration register to assert and the type of combinatorial logic that receives the combiner configuration register outputs may determine the formulas used for filtering the bus events occurring on the bus traffic at the coherence point on the SOC. Alternatively, the formulas may filter the bus events occurring on another global ordering point of an integrated circuit design. For example, storing a deasserted value in bits 15, 11, 7, and 3 of the combiner configuration register may remove the concatenated field 3 (trust zone, address) from being a qualified match during bus event filtering.

Examples of Boolean formulas to use with the compare result register and the combiner configuration register are shown in the following:

Field_Combiner_In[15:0] =

{~Field_Compare_Results[3:0] & Field_Combiner_Config[15:12],

Field_Compare_Results[3:0] & Field_Combiner

_Config[11:8], ~Field_Compare_Results[3:0] &

Field_Combiner_Config[7:4],

Field_Compare_Results[3:0] & Field_Combiner_Config[3:0]}

Combiner_AND =

((Field_Combiner_In[15:8] == Field_Combiner_Config[15:8]) &

(Field_Combiner_In[15:8] != 8'h0))

Combiner_OR = (Field_Combiner_In[15:8] != 8'h0)

Combiner_Final = (Combiner_AND[7:0] | Combiner_OR[7:0])

As seen in the above, in some embodiments, the final event filtering result is asserted if each of the Boolean AND conditions is satisfied (true) or if any of the Boolean OR conditions is satisfied (true). The final event filtering result may be output after the comparison stage and the combiner stage in the event filter pipeline. An asserted final result may cause one or more bus event counters to be updated. Additionally, an asserted final result may cause the stored trace instruction to be sent as a valid input to the merge logic 920. If multiple valid trace instructions are sent to the merge logic 920, a priority scheme may be used to determine which trace instruction is executed. In various embodiments, the End instruction may have the highest priority followed by the Pause instruction and the Start instruction. In some embodiments, only one instruction is executed in a given clock cycle. In other embodiments, one instruction per bus class and per separate trace RAM may be executed in a given clock cycle. The trace state and action 930 are output from the merge logic 922. Although the Boolean AND and OR operations are used in the above formulas, other Boolean operations and other methods to combine the match results for bus event filtering are possible and contemplated.

Trace instructions may also come through the CTI block 540 via the trigger ring 544 and the CTM block 542. In various embodiments, the trace instruction types that come through the CTI block 542 are the same instruction types that may come from the event filter pipelines 910a-910f. Trace instructions may travel both in and out through the CTI block 542. The merge logic 922 selects between the trace instruction at the output of the merge logic 920 and the trace instruction from the CTI block 540. Again, a priority scheme may be used in the merge logic 922. In some embodiments, the trace instructions that are not selected may be buffered for execution in later clock cycles.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
   a shared memory;
   a plurality of functional blocks, each configured to access the shared memory;
   a cache coherence controller configured to provide to the functional blocks a consistent data value for a given data block in the shared memory;

a plurality of buses configured to transfer coherent messages between the shared memory and the cache coherent controller; and a trace unit comprising a trace buffer with a plurality of physical partitions assigned to subsets of the plurality of buses; and wherein in response to detecting a traceable bus event on a given bus of the plurality of buses, the trace unit is configured to selectively update a given partition of the plurality of physical partitions assigned to the given bus, wherein said update comprises at least a local time count.

2. The semiconductor chip as recited in claim 1, wherein partitioning of the trace buffer is programmable.

3. The semiconductor chip as recited in claim 2, wherein the given partition is updated with at least trace statistics comprising at least an associated count of the traceable bus event.

4. The semiconductor chip as recited in claim 3, wherein one or more traceable bus events occur within two or more buses of the plurality of buses grouped into a bus class.

5. The semiconductor chip as recited in claim 1, wherein the local time count measures a duration of time since a most recent update of the given partition.

6. The semiconductor chip as recited in claim 5, wherein each of the plurality of physical partitions comprises a plurality of entries and a plurality of pointers, wherein a first pointer indicates a first entry updated with trace information and a second pointer indicates a second entry being a last most recent entry updated with trace information.

7. The semiconductor chip as recited in claim 6, wherein each of the plurality of physical partitions further comprises a third pointer indicating a third entry being an entry updated when a trace start instruction is executed.

8. The semiconductor chip as recited in claim 6, wherein the trace unit is further configured to delay for a programmable amount of time starting updates to the plurality of physical partitions after a trace start instruction is executed.

9. The semiconductor chip as recited in claim 6, wherein the trace unit is further configured to delay for a programmable amount of time stopping updates to the plurality of physical partitions after a trace end instruction is executed.

10. The semiconductor chip as recited in claim 6, wherein in response to detecting a trace end instruction is executed and any programmable delay for stopping tracing is satisfied, the trace unit is further configured to update each of the plurality of physical partitions with a global time-base count.

11. The semiconductor chip as recited in claim 10, wherein each of the physical partitions is a random access memory (RAM).

12. The semiconductor chip as recited in claim 10, wherein the semiconductor chip is a system-on-a-chip (SOC).

13. A method comprising:
accessing a shared memory for a plurality of functional blocks;
transferring coherent messages across a plurality of buses between the shared memory and a cache coherent controller configured to provide to the functional blocks a consistent data value for a given data block in the shared memory; and
in response to detecting a traceable bus event on a given bus of the plurality of buses, selectively updating a given partition of a plurality of physical partitions within a trace buffer, wherein the given partition is assigned to the given bus, wherein said updating comprises updating at least a local time count.

14. The method as recited in claim 13, wherein partitioning of the trace buffer is programmable.

15. The method as recited in claim 14, further comprising updating the given partition with at least trace statistics comprising at least an associated count of the traceable bus event.

16. The method as recited in claim 15, wherein one or more traceable bus events occur within two or more buses of the plurality of buses grouped into a bus class.

17. The method as recited in claim 13, wherein the local time count measures a duration of time since a most recent update of the given partition.

18. The method as recited in claim 17, wherein in response to detecting a trace end instruction is executed and any programmable delay for stopping tracing is satisfied, the method further comprises updating each of the plurality of physical partitions with a global time-base count.

19. A trace unit for capturing debug traces on an integrated circuit comprising:
an interface for receiving a plurality of buses configured to transfer coherent messages between a shared memory and a cache coherent controller configured to provide to a plurality of functional blocks a consistent data value for a given data block in the shared memory;
a trace buffer comprising a plurality of physical partitions, wherein said update comprises at least a local time count; and
control logic configured to selectively update a given partition of the plurality of physical partitions assigned to the given bus, in response to detecting a traceable bus event on a given bus of the plurality of buses.

20. The trace unit as recited in claim 19, wherein partitioning of the trace buffer is programmable.

21. The trace unit as recited in claim 19, wherein the local time count measures a duration of time since a last most recent update of the given partition.

22. The trace unit as recited in claim 19, wherein in response to detecting a trace end instruction is executed and any programmable delay for stopping tracing is satisfied, the trace unit is further configured to update each of the plurality of physical partitions with a global time-base count.

23. A non-transitory computer readable storage medium comprising program instructions operable to capture debug traces on an integrated circuit, wherein the program instructions are executable to:
access a shared memory for a plurality of functional blocks;
transfer coherent messages across a plurality of buses between the shared memory and a cache coherent controller configured to provide to the functional blocks a consistent data value for a given data block in the shared memory; and
in response to detecting a traceable bus event on a given bus of the plurality of buses, selectively update a given partition of a plurality of physical partitions within a trace buffer wherein said update comprises at least a local time count.

24. The storage medium as recited in claim 23, wherein partitioning of the trace buffer is programmable.

25. The storage medium as recited in claim 24, wherein the local time count measures a duration of time since a last most recent update of the given partition.

* * * * *